April 24, 1951  J. B. GODSHALK  2,550,344
THERMALLY CONTROLLED BATTERY CHARGER
Filed Oct. 31, 1949  5 Sheets-Sheet 1

INVENTOR
James B. Godshalk
BY Stone, Boyden & Mack,
ATTORNEYS

April 24, 1951 J. B. GODSHALK 2,550,344
THERMALLY CONTROLLED BATTERY CHARGER
Filed Oct. 31, 1949 5 Sheets-Sheet 4

INVENTOR
James B. Godshalk
BY Stone, Boyden & Mack,
ATTORNEYS

April 24, 1951     J. B. GODSHALK     2,550,344
THERMALLY CONTROLLED BATTERY CHARGER
Filed Oct. 31, 1949     5 Sheets-Sheet 5

INVENTOR
James B. Godshalk
By Stone, Boyden & Mack,
ATTORNEYS

Patented Apr. 24, 1951

2,550,344

UNITED STATES PATENT OFFICE 2,550,344

THERMALLY CONTROLLED BATTERY CHARGER

James B. Godshalk, Philadelphia, Pa., assignor, by mesne assignments, to Sterlingworth Company, Philadelphia, Pa., a corporation of Delaware Application October 31, 1949, Serial No. 124,612

10 Claims. (Cl. 320—36)

This invention relates to battery chargers and more particularly to battery chargers wherein charging is terminated automatically in response to the increase of internal temperature of the battery during charging.

It has been proposed to utilize a thermally responsive control circuit in battery chargers as the sole means for terminating charging, thus eliminating the mechanical time switch usually employed to determine duration of the charge. One manner in which this proposal may be carried out is taught by Patent 2,296,924 to Heyer. As disclosed in this patent, the control circuit includes a thermostatic switch inserted through the filling opening of the battery, the circuit being arranged to cause a relay to interrupt the charging circuit when the internal temperature of the battery, as detected by the thermostatic switch reaches a fixed maximum value of about 130° F. The battery is charged at a high rate, on the order of 900 watts, and is considered to be fully charged when the thermally responsive control device automatically terminates charging. This procedure has the advantage of simplicity, since no adjustments are required, but also has two serious disadvantages. First, if the initial internal temperature of the battery is low, an unduly long time is required to raise the internal temperature to 130°, and since the battery is substantially charged at a temperature considerably below 130°, much of this time may actually be wasted. Second, if the initial internal temperature is high, as on the order of 100° or more, and the rate of charging is high, the battery will not be fully charged when its temperature reaches 130°.

Another way in which a thermally responsive control device may be employed in a battery charger as the sole means of terminating charging is disclosed in a co-pending application, Serial Number 123,722, filed October 26, 1949, by James B. Godshalk and Lewis A. Medlar. According to this second method, the initial temperature of the battery is determined and the battery then charged until the battery temperature has traversed a predetermined rise above its initial value. The method is based upon the discovery that the state of charge of the battery increases during the temperature rise according to a definite curve, and that this curve is dependent only upon the power level of charging and the initial state of charge of the battery. The temperature rise method, by giving a definite basis for choice of the power level of charging and of the particular temperature rise, provides for accurate charging in a minimum time, and thus eliminates the main disadvantages of the maximum temperature cut-off method disclosed in Patent 2,296,924, above discussed. But the temperature rise method requires manual adjustment of the charger if successive batteries are to be charged through different temperature rises.

Whether employed in the maximum temperature cutoff method or the temperature rise method, thermally responsive control devices for battery chargers fall into two general classes. The first class involves a thermostatic switch unit constructed for insertion through the battery filling opening and arranged to control a relay for making and breaking the charging circuit. A typical thermostatic switch unit is described in Reissue Patent 22,883 to Heyer, and a typical manner in which the thermostatic switch may be arranged to control the relay is shown in Patent 2,354,877 to Peters. Thermally responsive control devices of the second class employ an electronic circuit controlled by a thermistor unit inserted in the battery, the electronic circuit being arranged to control a relay, making and breaking the charging circuit. Typical thermistor controlled circuits, and the manner in which they are employed, are disclosed in co-pending application Serial Number 87,494, filed April 14, 1949, by Lewis A. Medlar and James B. Godshalk, now Patent Number 2,529,038.

An object of the present invention is to provide a battery charging apparatus which will require no manual adjustments, will terminate charging automatically in accordance with the increase of the internal temperature of the battery being charged, and will embody the practical advantages of the temperature rise method of charging.

A further object of the invention is to provide a battery charger, particularly adapted for charging automotive storage batteries, which will have much less tendency to overcharge than do thermally controlled chargers presently employed in commercial practice.

A still further object of the invention is to provide a battery charger which will automatically charge storage batteries to a maximum practical state of charge within a minimum time commensurate with the power level of charging employed.

Broadly stated, the present invention comprises a battery charger, having a control circuit influenced jointly by a first thermally responsive element constructed for insertion in the battery and a second thermally responsive element subjected to ambient temperature. The control circuit is arranged to automatically terminate charging in response to predetermined conditions of ambient temperature and internal temperature of the battery. The effect of the second thermally responsive element is to adjust or compensate the temperature of the battery at which the control circuit operates to interrupt charging, raising this temperature if the ambient temperature is high and lowering it if the ambient temperature is low. The first thermally responsive element may be a thermostatic switch, in which case the second element may be a suitable thermally adjustable mechanical element, such as a bimetallic arm, arranged to adjust the thermostatic switch in accordance with the prevailing ambient temperature. Or the first thermally responsive element may be a thermally variable impedance controlling a balanceable network, in which case the second thermally responsive element may be a second thermally variable impedance exposed to ambient temperature and arranged to control the network in a manner compensating for different ambient temperatures. The thermally responsive element subjected to ambient temperature may be located outside of the battery adjacent thereto, or at some desired point in the charger casing, or at any other convenient point materially removed from the effect of the internal temperature of the battery.

In order that the invention may be readily understood, reference is had to the accompanying drawings, forming part of this specification, and in which.

Figure 1:
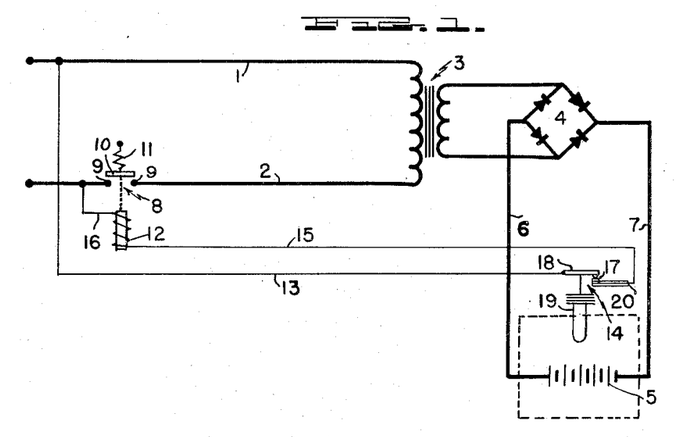
Fig. 1 is a schematic diagram of one embodiment of the invention including a thermostatic switch responsive to the internal temperature of the battery being charged but compensated for ambient temperature.

Referring now to the drawings in detail, and first to Fig. 1 thereof, there is shown a conventional charging circuit for supplying charging current to a battery, this circuit preferably comprising alternating current power leads 1 and 2 supplying the primary of a transformer 3, the secondary of this transformer being connected to any suitable rectifier 4 which converts the transformer output to direct current to be supplied to battery 5 over leads 6 and 7.

A relay 8 is arranged to normally break one of the power leads of the charging circuit, but to complete that lead when the relay is energized. The relay 8 is illustrated as comprising contacts 9 in lead 2 and a contact-closing element 10 held in normally open position by a spring 11, element 10 being arranged to be moved to close contacts 9 whenever winding 12 of the relay is energized. It will be understood by those skilled in the art that relay 8 may be any suitable conventional normally open relay. Winding 12 of relay 8 is connected across the power leads of the charging circuit by an actuating circuit comprising conductor 13, the contacts of thermostatic switch unit 14, and conductors 15 and 16.

Thermostatic switch unit 14 includes a relatively stationary contact 17 and a contact 18 normally engaged therewith but arranged to be moved out of engagement with contact 17 by a thermostatic element 19 inserted in the battery 5 through the filling opening thereof. The position of contact 17 is determined by a bi-metal 20 located outside of the battery and exposed to the ambient temperature at the battery. Bimetallic arm 20 is designed to move contact 17, when the ambient temperature is low in a direction such that a relatively smaller actuating movement of the thermostatic element 19 will cause the contacts 17 and 18 to open than would be the case if arm 20 were not thermally adjustable. When the ambient temperature increases, bimetallic arm 20 moves contact 17 in the opposite direction.

Thus the contacts 17 and 18 are normally closed, but are opened by the thermostatic element 19 whenever the internal temperature of the battery reaches a high value, hereafter referred to as the cutoff temperature, such temperature being determined jointly by the characteristics of thermostatic element 19 and the prevailing ambient temperature affecting bimetal 20. When the ambient temperature affecting bimetal 20 is low, the cutoff temperature is lowered, and when the ambient temperature is high, the cutoff temperature is raised. Since the duration of charging is the length of time required for the effects of charging to raise the internal temperature of the battery from its initial value to the cutoff value, and since the initial internal temperature will ordinarily vary more or less as the ambient temperature varies, it follows that when the ambient temperature falls and the cutoff temperature is correspondingly lowered, the duration of charging is shortened in comparison with the duration of charging which would result during charging under the same conditions by the fixed maximum temperature cutoff method previously mentioned.

It will be seen from Fig. 1 that, when contacts 17 and 18 are engaged, winding 12 of relay 8 is energized and contacts 9 are closed, completing the charging circuit. When charging has progressed until the internal temperature of battery 5 reaches the cutoff point, contacts 17 and 18 are disengaged, winding 12 is de-energized, and contacts 9 are opened, terminating charging.

Figure 2:
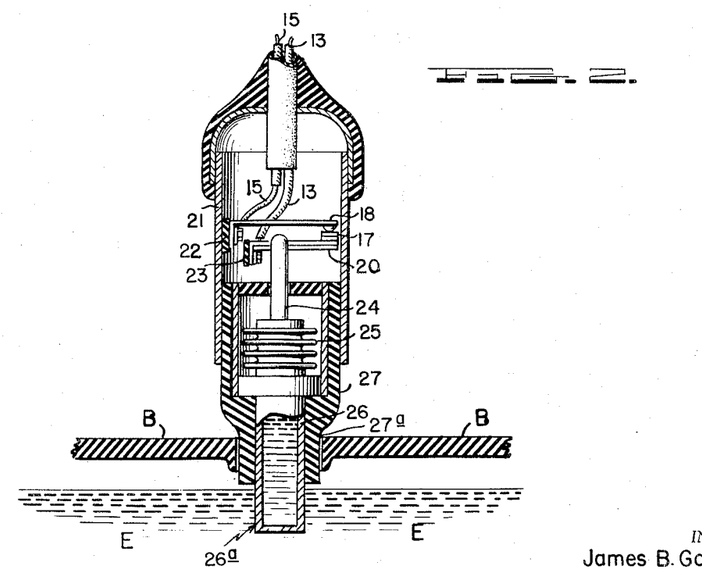
Fig. 2 is a vertical sectional view of one form of ambient temperature-compensated thermostatic switch unit which may be employed in the circuit illustrated in Fig. 1.

One possible embodiment of a thermostatic switch unit 14, suitable for use in Fig. 1, is illustrated in Fig. 2. Here it will be seen that contact 18 comprises a light spring arm secured to but insulated from a tubular metal casing 21 at 22. Bimetal 20 is similarly secured to casing 21 at 23. Contact arm 18 is arranged to be engaged from below by a push rod 24 extending upwardly from a flexible metal bellows 25. The interior of bellows 25 communicates with the interior of a tubular member 26 constructed of suitable acid resistant, heat conducting material. Bellows 25 and tube 26 contain a quantity of heat expansible liquid sufficiently large to effect substantial expansion and contraction of the bellows, and a corresponding movement of the rod 24, in accordance with variations in temperature of the tube 26. Bellows 25 and the upper portion of tube 26 are enclosed in a heat insulating casing 27, but tube 26 extends down below the casing, providing exposed portion 26ª. The lower portion 27ª of casing 27 is of a diameter slightly smaller than the diameter of the filling opening of a battery. Contacts 17 and 18 are connected in any suitable manner to conductors 13 and 15, respectively, previously identified in Fig. 1, these conductors being part of a conventional flexible insulated cable of sufficient length to reach from the main casing of the charging apparatus to the battery.

In use, portion 27ª of casing 27 is inserted through the filling opening of the cover of the battery to be charged illustrated at B in Fig. 2, thus bringing the exposed portion 26ª of tube 26 into contact with the electrolyte E of the battery. The battery is of course connected to the charger as illustrated in Fig. 1 and, presuming that the battery temperature is sufficiently low, contacts 17 and 18 will be engaged, relay 8 will therefore be closed, and charging will proceed. In Fig. 2, it will be noted that casing 21 is uninsulated, and bimetal 20 is therefore substantially at ambient air temperature. Though some heat from the battery may be conducted into casing 21 by rod 24, this factor can be compensated by choice of the characteristics of bimetal 20. The vertical position of push rod 24 depends upon the volume of the heat expansible liquid in bellows 25 and tube 26, and thus upon the temperature of the battery electrolyte. As the electrolyte temperature rises during charging, bellows 25 expands, and rod 24 moves upwardly.

Bimetal 20 is so constructed as to move stationary contact 17 downwardly when the ambient temperature decreases, and to move contact 17 upwardly as the ambient temperature increases. Contact arm 18 is of light resilient material and, when it is secured to casing 21, is so positioned as to engage contact 17 even when bimetal 20 is subjected to ambients as low as 0° F. But the material of contact arm 18 is sufficiently light that flexing of bimetal 20 in response to temperature changes is not materially impeded. Contact 17 normally engages contact arm 18, normal conditions being a relatively low battery temperature and ambient temperatures not usually exceeding 110° F. It will be obvious to those skilled in the art that bellows 25, rod 24, and the organization comprising contact arm 18, contact 17 and bimetal 20 can be designed so that contact arm 18 will be disengaged from contact 17 upon occurrence of any desired battery temperature, as determined by the bellows, with reference to a given ambient temperature, as detected by the bimetal. As will be hereinafter more fully described, it is preferred that the unit be so designed that the contacts are disengaged upon occurrence of a battery temperature of 80° F. at an ambient of 0° F., and also upon occurrence of a battery temperature of 125° F. at an ambient of 100° F. Thus, the cutoff point is raised or lowered as the ambient temperature increases or decreases, the operation of the relay circuit to interrupt charging therefore depending upon the occurrence of predetermined relative values of internal battery temperature and ambient temperatures.

The embodiment of the thermostatic switch unit shown in Fig. 2 is chosen for illustrative purposes only and it is obvious that ambient temperature compensation of a suitable thermostatic switch unit may be accomplished in other ways.

Figure 1A:
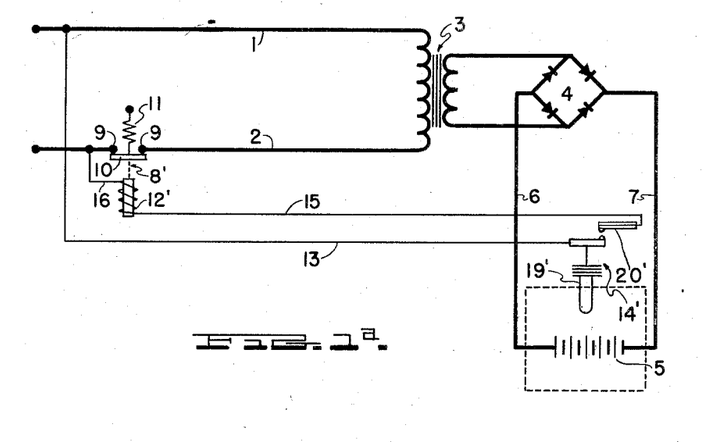
Fig. 1a is a schematic diagram of an embodiment of the invention similar to that shown in Fig. 1, but including a normally closed relay in the charging circuit.

The invention has been described, with reference to Figs. 1 and 2, as embodying a battery charger including a normally open relay in the charging circuit, the actuating circuit of this relay being controlled by a normally closed thermostatic switch. This combination is advantageous in that it gives "fail-safe" operation, most failures of the relay actuating circuit causing the relay to open, interrupting charging. But the invention is not limited to this combination when a thermostatic switch is employed as the first thermally responsive element. As shown in Fig. 1ª, the device may include a normally closed relay 8' adapted to be opened upon energization of winding 12'. In this event, the thermostatic switch is normally open, as indicated at 14', and is designed to close only in response to predetermined relative temperature conditions of thermally responsive elements 19' and 20'.

Figures 3, 4:
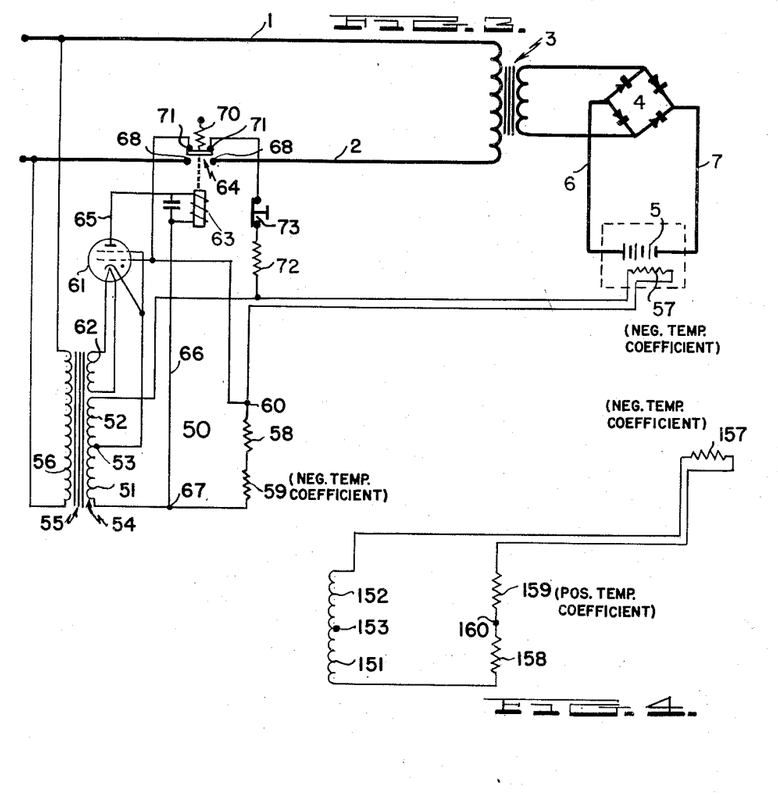
Fig. 3 is a schematic diagram of a battery charger employing a thermally responsive control circuit comprising a Wheatstone bridge including both a thermally responsive impedance subjected to the internal battery temperature and a thermally responsive compensating impedance responsive to ambient temperature.
Fig. 4 is a schematic diagram of a modified Wheatstone bridge circuit which may be used in an arrangement such as that shown in Fig. 3.

In Fig. 3, the invention is disclosed as embodied in a battery charger including a charging circuit the same as that shown in Fig. 1, and a thermally responsive control circuit comprising a negative temperature coefficient thermistor adapted for insertion in the battery, a Wheatstone bridge controlled by the thermistor, a relay arranged to make and break one of the power leads of the charging circuit, and an actuating circuit for the relay responsive to output conditions of the bridge, the bridge being compensated for ambient temperatures by means of a second thermistor.

Wheatstone bridge 50 comprises a pair of ratio arms including inductances 51 and 52 provided by tapping at 53 the secondary winding 54 of a transformer 55. Primary 56 of the transformer is connected across the power leads of the charging circuit as shown, so that bridge 50 is supplied with alternating current. The remaining two arms comprise negative temperature coefficient thermistor 57, constructed for insertion through the filling opening of the battery, connected in one arm, and a fixed resistance 58 in series with a second negative temperature coefficient thermistor 59 making up the arm balancing said first mentioned arm. The output points of bridge 50 are at 59 and 60.

Output points 59 and 60 are connected to the cathode and control grid respectively of a thermionic tube 61, which is preferably a thyratron. The cathode of tube 61 may be heated by means of the usual heater supplied from a supplementary secondary 62 on transformer 55. The plate of tube 61 is connected to winding 63 of a relay 64 by conductor 65, and thence by conductor 66 to point 67 in the side of bridge 50 nearest the second thermistor 59. Thus, winding 63 is energized only when tube 61 is conductive. It will be seen that the plate supply for tube 61 is thus taken through inductance 51, and that the output of the bridge 50 is applied across the cathode and grid of the tube.

Relay 64 includes contacts 68 in power lead 2, and a contact closing element 69 normally held out of engagement with contacts 68 by spring 70 but arranged to be drawn into a position bridging said contacts when winding 63 is energized. Contacts 68 are thus normally open, interrupting the charging circuit, but are closed, completing the charging circuit, whenever the tube 61 is conductive. Relay 64 is also provided with a second set of contacts 71 which are normally closed but open whenever tube 61 is conductive and winding 63 therefore energized. This second set of contacts controls an unbalancing circuit including fixed resistance 72 and normally closed push-button switch 73. When contacts 71 and switch 73 are both closed, resistance 72 is connected in parallel with thermistor 57.

Except for the second thermistor 59 the circuit just described is fully disclosed in the forementioned co-pending application, Serial Number 87,494, filed April 14, 1949. Operation of the circuit without thermistor 59 is fully discussed therein, and will be described only generally in the present application.

The ratios of bridge 50 are so chosen that, when negative temperature coefficient thermistor 57 is inserted in a battery having a relatively low initial internal temperature; the bridge is unbalanced in a sense causing tube 61 to be conductive and winding 63 to be therefore energized, so that contacts 68 are closed and charging may proceed. As the temperature within the battery rises during charging, the resistance of thermistor 57 accordingly decreases, and the initial unbalance of the bridge is progressively recovered. When the bridge is substantially balanced, tube 61 becomes non-conductive, winding 63 is accordingly deenergized, and contacts 68 are opened, thus terminating charging. The temperature of the battery, and therefore of thermistor 57, at which the bridge balances, may be called the cutoff temperature.

Figure 7:
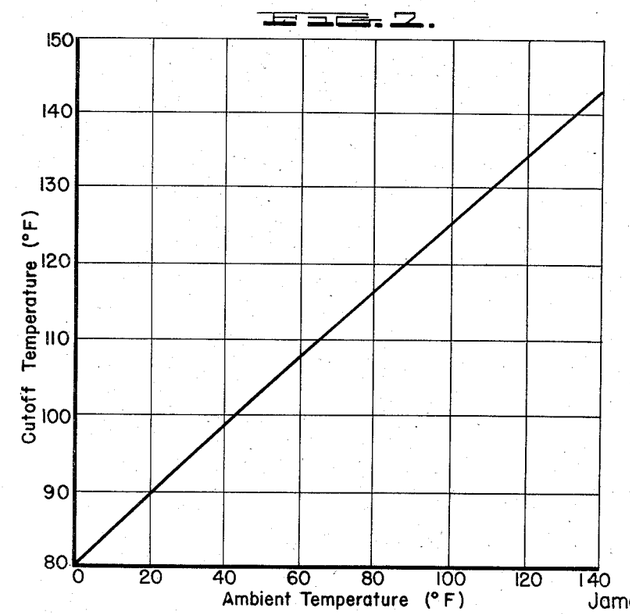
Fig. 7 is a diagram illustrating a curve showing cutoff temperatures plotted against ambient temperatures, obtained with a preferred embodiment of the apparatus as shown in Fig. 3.

As pointed out in said co-pending application, Serial Number 87,494, the main components of the charging and control circuits are mounted in a suitable casing. I prefer to position thermistor 59 within the charger casing at a point which increases only slightly in temperature during charging, and which is substantially at the temperature of the air surrounding the charger, that is, substantially at ambient temperature. As the ambient temperature decreases, the resistance of the thermistor 59 is increased, since the thermistor has a negative temperature coefficient. Increases of the resistance of thermistor 59 lowers the cutoff temperature, since in its effect on bridge 50 it is equivalent to a decrease in resistance of thermistor 57. As the ambient temperature increases, the resistance of thermistor 59 decreases, and the cutoff temperature is accordingly raised. I prefer to so choose the values and characteristics of the two thermistors and resistance 58 that the cutoff temperature will be about 80° F. when the ambient is 0° F., and 125° F. when the ambient is 100° F. In Fig. 7, there is shown a curve obtained by plotting ambient temperatures against cutoff temperatures when the bridge is designed as just described. Here, it will be seen that the locus of the cutoff points is substantially a straight line, and that the cutoff temperature at a 40° F. ambient is therefore about 97° F., and the cutoff temperature at a 60° F. ambient is about 107° F.

As pointed out in the introduction to this specification, a disadvantage of the maximum temperature cutoff method of charging previously described is that the battery is substantially charged before the maximum temperature is reached, if the ambient is low, and an excessive amount of time must be expended in reaching the cutoff point. It has also been pointed out, that this disadvantage has been overcome by the temperature rise method of charging disclosed in co-pending application, Serial Number 123,722. As will now be explained, the apparatus of the present invention is automatically operable to carry out charging in a manner which represents a practical compromise between the maximum temperature cutoff method and the tempertaure rise method.

If the apparatus disclosed in Fig. 3 is designed to have a cutoff temperature of 80° F. at a 0° F. ambient, and of 125° F. at an ambient of 100° F., it is obvious that, were the ambient temperature actually the same as the initial temperature of the battery, the apparatus would charge through a temperature rise of 80° F. at an ambient of 0° F., and through a temperature rise of 25° F. at an ambient of 100° F. From the data given in said co-pending application, Serial Number 123,722, the percent of charge that would result from charging at any definite power level can be easily computed. For example, if the battery is initially ⅔ discharged (full discharge conditions of a 6 volt battery being obtained by discharging at the 20-hour rate to a terminal voltage of 5.25 v.), and the power level is 600 watts through a high resistance charging circuit, a temperature rise of 80° F. would give 100% charge, and a temperature rise of 25° F. would give better than 70% charge, which is quite adequate for automotive purposes. Still presuming the ambient temperature to be the same as the initial internal temperature of the battery, it can readily be seen that, when the maximum temperature cutoff method is employed, the ambient being 0° F. and the power level 600 watts, the time spent in charging to raise the temperature of the battery from 80° F., at which point the battery is already fully charged, to a cutoff value of say 125° F., would be wasted. At an ambient temperature of 100° F., the results would be the same for both the apparatus shown in Fig. 3 and the maximum temperature cutoff method.

Though the ambient temperature will not necessarily be the same as the initial internal temperatures of the battery, the two temperatures are, in usual cases, similar. In unusual cases, the ambient temperature may differ from the internal temperature of the battery because of the high thermal lag of batteries. Thus, if an automobile were stored in a heated garage at, say 70° F., and then moved quickly to a service station where it was desired to charge the battery, and the outside temperature were 0° F., the battery might be at a temperature of only 50° F. by the time charging commenced. With the apparatus described with reference to Fig. 3, charging would then only be through a temperature rise of 30° F. since the cutoff value for that apparatus at an ambient of 0° F. is 80° F. This alone would be adequate, since it would raise most batteries to at least 75% of full charge. However, there is another factor which tends to cause the charge obtained by use of an ambient temperature compensated charger, when the initial battery temperature is considerably higher than ambient temperature, to be greater than would be expected. This factor is the tendency of the battery, at a temperature considerably above ambient, to lose heat more rapidly than if the internal temperature of the battery equalled or was close to ambient temperature. When the internal temperature at the start of charging is considerably above ambient temperature, the heat loss from the battery tends to offset the heat generated in the battery during the early period of the charge; in some cases, the internal temperature of the battery may even decline during the early portion of the charge. As charging progresses, sufficient heat is generated to cause the internal temperature to rise, and the cutoff temperature is eventually reached. But, the loss of heat early in the charge, due to a high initial internal temperature and a low ambient temperature, causes a definite lag in the temperature rise resulting from charging, and the final state of charge of the battery is therefore higher than would ordinarily be attained if the same temperature rise were employed and the initial internal temperature did not differ greatly from ambient temperature.

Figure 6:
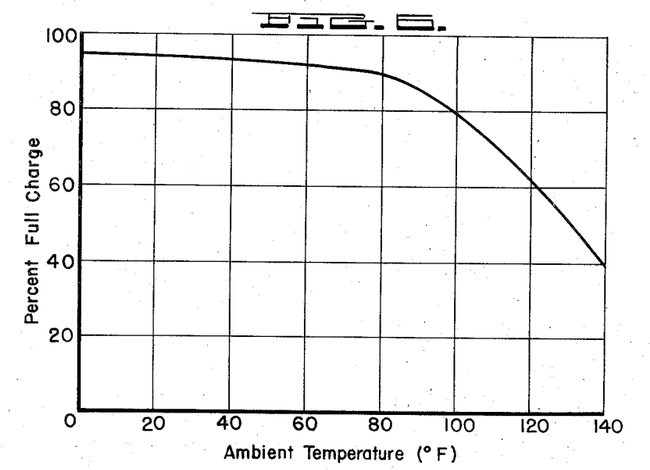
Fig. 6 is a diagram showing a curve illustrating states of charge in percent attained with the embodiment of the invention shown in Fig. 3, when charging a 100 ampere-hour storage battery at a power level of 600 watts, at various ambient temperatures.

A typical curve showing the states of charge in percent attained under normal conditions by a 100 ampere-hour battery, initially ⅔ discharged, when charged at a power level of charging of about 600 watts by a charging apparatus constructed in accordance with Fig. 3 as described, is shown in Fig. 6. Here it will be seen that approximately 95% of full charge results at low ambients and that better than 75% of full charge results at all ambients below about 105° F. It should be noted that this curve is for charging at a rate of about 74 amperes, and is limited to that case in which the cutoff points range in a straight line from 80° F. at an ambient of 0° F. to 125° F. at an ambient of 100° F.

It is obvious that, once the power level of charging has been decided upon, the percent of full charge attained at various ambient temperatures (that is, the shape of the curve corresponding to Fig. 6) will depend upon the range of the cutoff temperatures (that is, the shape and position of the curve corresponding to Fig. 7). For purposes of illustration, I have shown the cutoff points as ranging from 80° F. to 125° F., since this is a range that has been found to work out well in practice. The invention is in no wise limited in this respect, except that the range of cutoff points is inherently limited by the maximum temperature at which batteries can safely be charged. Obviously, the cutoff temperatures, determined by the relative natures of the first and second thermally responsive elements, need not range in a straight line, but may follow a curve such as to give more nearly equal temperature rises at various ambient temperatures. It should be noted that most thermally responsive elements, whether bimetallic elements or thermistors, do not have linear characteristics. The nature of the curve corresponding to that shown in Fig. 7 can be varied within wide limits by proper choice of the characteristics of the two thermally responsive elements.

From the foregoing, it will be seen that, by compensating the thermally responsive control circuit of the charger for ambient temperatures, the present invention attains approximately the results of temperature rise charging, substantially eliminating the waste of time inherent in the fixed maximum temperature cutoff method, and yet involves no manual adjustments.

Figure 8:
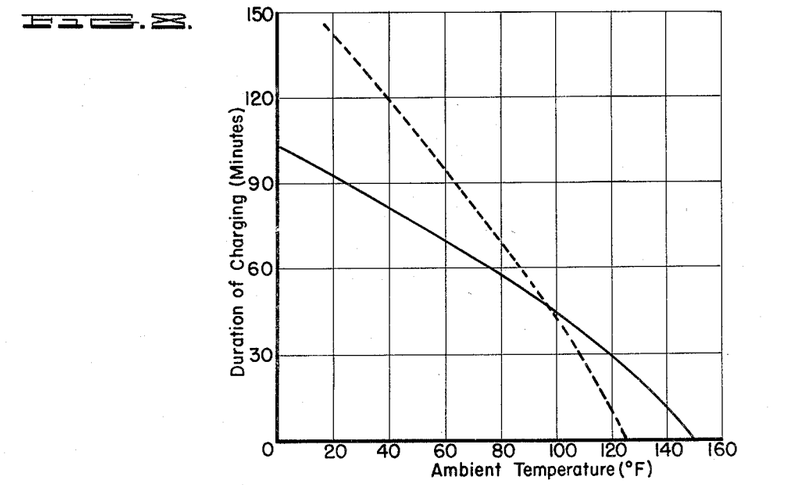
Fig. 8 is a diagram containing curves comparing durations of charging resulting from a preferred embodiment of the apparatus shown in Fig. 3, with durations of charging resulting from a comparable conventional charger operated according to the maximum temperature cutoff method, at various ambient temperatures.
Figure 9:
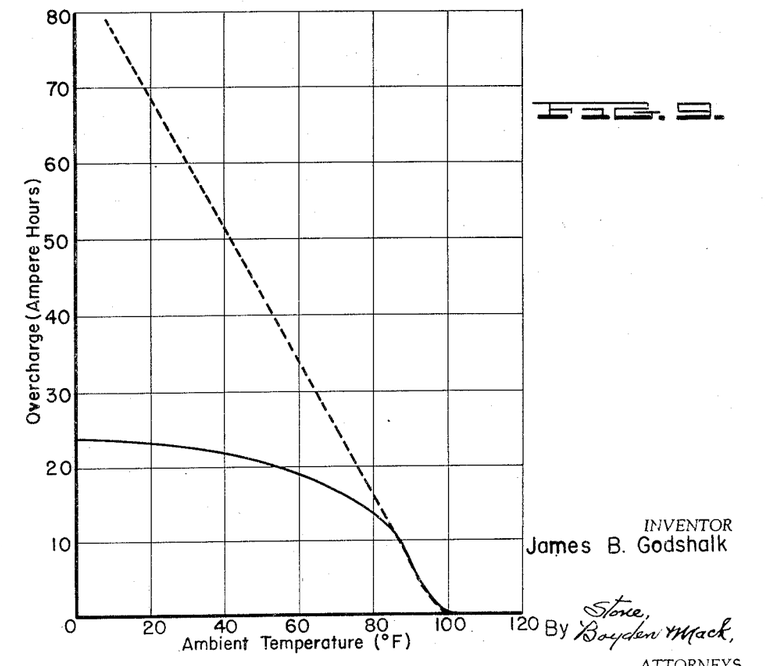
Fig. 9 is a diagram of curves comparing the overcharge resulting from a preferred embodiment of the apparatus as in Fig. 3 with overcharge resulting through use of a comparable conventional charger operated according to the maximum temperature cutoff method, at various ambient temperatures.

The advantages resulting will be clear from Figs. 8 and 9. In Fig. 8, the broken line curve represents charging times in minutes for the fixed maximum temperature cutoff method employing a charging level of 600 watts and a constant cutoff temperature of 125° F. The solid curve shows charging times for the apparatus of Fig. 3, with a power level of 600 watts, the circuit being designed to give the curve of cutoff values shown in Fig. 7. Both curves are for 100 ampere-hour batteries. It will be seen that the invention results in a decided decrease in charging time.

Fig. 9 deals with overcharge, which may be defined as the current used during charging which does not result in increasing the charge. Again, the broken line curve is for the maximum temperature cutoff method, charging at 600 watts with a 125° F. cutoff value, and the solid line curve for the apparatus of Fig. 3 as described, both curves being for 100 ampere-hour batteries. It will be seen that the invention effects a remarkable reduction in overcharging at the lower ambient temperatures.

It will be understood that, when the thermally responsive control circuit is of the type comprising a Wheatstone bridge including a first thermistor subjected to battery temperature and a second thermistor subjected to ambient temperature, it is not necessary that the two thermistors have the same temperature coefficient. In Fig. 4, I have illustrated a bridge circuit suitable for use in the apparatus shown in Fig. 3. Here the bridge comprises inductances 151 and 152, a negative temperature coefficient thermistor 157, a positive temperature coefficient thermistor 159, and a fixed resistance 158. Inductances 151 and 152 make up the ratio arms of the bridge. Thermistors 157 and 159 are in series in the variable arm of the bridge, and fixed resistance 158 makes up the remaining bridge arm. Thermistor 157 is constructed for insertion in the battery, and when in the battery, its resistance falls as the battery temperature rises. Thermistor 159 is subjected to the ambient temperature and, since thermistor 159 has a positive temperature coefficient, its resistance increases as the ambient temperature rises. A positive temperature coefficient thermistor in series with thermistor 157 in the variable arm of the bridge is equivalent to a negative temperature coefficient thermistor in series with resistance 158 in the fixed arm of the bridge, and it is therefore obvious that operation of the brige illustrated in Fig. 4 is equivalent to the operation of bridge 59 in Fig. 3.

The invention may also be applied to a thermally responsive control circuit constructed for automatic deenergization of the charging circuit whenever the first thermally responsive element is not inserted in the battery, circuits by which this automatic safety action may be accomplished being described in co-pending application, Serial No. 97,772, filed June 3, 1949, by Lewis A. Medlar, now Patent 2,499,663, issued March 7, 1950. A preferred form of the invention as applied to such a safety circuit involves a modified Wheatstone bridge employed in the same manner as the bridge 50 of Fig. 3, this modified bridge being illustrated in Fig. 5. Here, the bridge is shown as comprising inductances 251 and 252 which make up the ratio arms of the bridge, a thermistor 257 arranged for insertion in the battery 5a as hereafter described, and a fixed resistance 258 in the arm of the bridge balancing thermistor 257, resistance 258 having in parallel therewith under certain circumstances a second thermistor 259 subjected to ambient temperature. The two thermistors preferably have negative temperature coefficients and, in any event, have like temperature coefficients.

Figure 5:
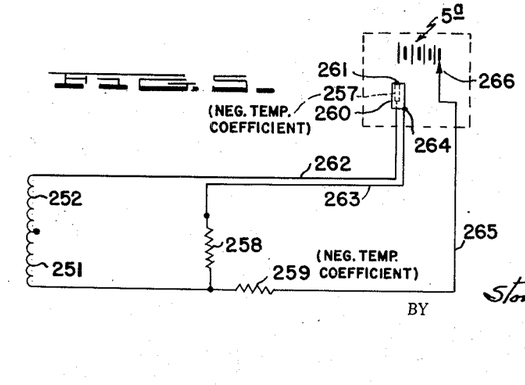
Fig. 5 is a schematic diagram of a further modified Wheatstone bridge circuit which may be employed in place of the Wheatstone bridge illustrated in Fig. 3.

Thermistor 257 is enclosed within an electrically conductive acid resistant casing 260, and one terminal of the thermistor is connected to the casing at 261, the other terminal being connected into the bridge by conductor 262 as shown. Casing 260 is connected to the bridge as shown by conductor 263, which connects to the casing at 264. Thus the arm of the bridge sensitive to battery temperature comprises in series conductor 262, thermistor 257, casing 260, and conductor 263. The exterior of casing 260 is exposed, so that when the casing is properly inserted in the battery it comes into electrical contact with the battery electrolyte.

Thermistor 259 is connected in parallel with resistance 258 by a circuit comprising conductor 265 and a terminal 266 of battery 5a, the battery electrolyte, casing 260, and conductor 263. It will be seen that this circuit is complete only when casing 260 is inserted in the battery so as to be in electrical contact with the battery electrolyte. The bridge is employed in a battery charger in the same manner as bridge 50, of Fig. 3, unbalance of the bridge in a sense caused by a low temperature of thermistor 257 causing the charging circuit to be completed. The values of the resistances of the bridge are so chosen that, when the circuit connecting thermistor 259 in parallel with resistance 258 is broken, the value of resistance 258 is sufficient to unbalance the bridge in the same sense that would be caused by an excessive temperature of thermistor 257. The value of thermistor 259 is such that, when connected in parallel with resistance 258, the value of the parallel combination is sufficiently low to allow a low temperature of thermistor 257 to cause the bridge to be unbalanced, and the charging circuit is thus automatically completed as previously described with reference to Fig. 3. Thermistor 259, subjected to the ambient temperature, lowers the cutoff value, if the ambient decreases, and raises the cutoff value if the ambient increases, as described with reference to Fig. 3. In actual practice, it is ordinarily necessary to employ a fixed resistor (not shown) in series with thermistor 259, in order to obtain both the necessary total resistance value of the parallel combination and the proper compensation for ambient temperature.

From Figs. 3–5, it will be seen that the two thermistors may have like or unlike coefficients, depending upon their arrangement in the bridge. It is obvious that the thermally responsive elements need not be thermistors, other suitable thermally responsive impedances being readily available to the trade.

Though it is believed that the meanings of terms employed in the specification will be clear to those skilled in the art, the following definitions of terms used in the appended claims are given:

(1) By cutoff temperature, we mean the internal temperature of the battery, as detected by the thermally responsive element inserted in the battery, at which charging is discontinued. With respect to the present invention, the cutoff temperature depends upon the prevailing ambient temperature and the design of the thermally responsive control circuit. Cutoff temperature and cutoff point are used synonymously.

(2) By ambient temperature, we mean the temperature of the air outside of the battery at the point of location of the second thermally responsive element. The point of location of the second thermally responsive element may be immediately adjacent the battery, or within the main casing of the charger, or at a similar convenient position materially removed from the effect of the internal temperature of the battery.

(3) By charging circuit, we mean the main power circuit of a charger as distinguished from those subsidiary circuits usually employed for control, testing and like purposes. Thus, a charging circuit within the meaning of the term as here employed may comprise either a simple circuit for delivering the output of a direct current generator to a battery, or may comprise the combination of an alternating current supply, a transformer, a rectifier, and the rectifier output circuit, as is now common practice in the fast charging art.

Reference has been had to co-pending applications, Serial Numbers 87,494, 97,772 (now Patent 2,499,663) and 123,722. Application Serial Number 87,494 is directed to a maximum temperature cutoff device for battery chargers including a balanceable network controlled by a thermally responsive impedance which is subjected only to the internal temperature of the battery. Circuits claimed in application Serial Number 87,494 are similar to that shown in Fig. 3 of the present application, but are distinct therefrom in that they do not include a second thermally responsive impedance subjected to ambient temperature. Patent 2,499,663 relates solely to safety devices for control circuits such as are shown in the present invention. Application Serial Number 123,722 is directed to a method and apparatus whereby batteries are charged through a selected temperature rise. That application again is distinct from the present invention in that application Serial Number 123,722 does not disclose means responsive to ambient temperature. It is thus to be understood that the present invention is directed to battery chargers in which there is not only a thermally responsive element responsive to the internal temperature of the battery being charged, but also a thermally responsive element subjected to ambient temperature.

I claim:

1. In a battery charger, a thermally responsive element constructed for insertion in the battery to be charged, means controlled by said element for supplying current to a battery so long as its temperature remains below a definite value and for cutting off the supply of current to the battery when its temperature reaches such value, and means for automatically varying the cutoff point in accordance with ambient temperature.

2. In a battery charger, a charging circuit, a thermally responsive element adapted to be subjected to the internal temperature of the battery to be charged, means controlled by said element for maintaining said charging circuit completed so long as the internal temperature of the battery is below a certain definite value and for interrupting said circuit and thus cutting off charging current from the battery when its temperature exceeds such value, and means whereby said cut-off point is automatically adjusted in accordance with variations in ambient temperature.

3. In a battery charger, a charging circuit, a first thermally responsive element constructed to be inserted in the battery to be charged, means controlled by said element for maintaining said circuit closed so long as the temperature of the battery remains below a definite value and for interrupting said circuit when the temperature of the battery reaches such value, a second thermally responsive element subjected to ambient temperature, and means whereby said second element determines the battery temperature value at which said circuit is interrupted.

4. In a battery charger the combination of a charging circuit, a circuit interrupter arranged to make and break said charging circuit, first thermally responsive means constructed to be inserted in the battery to be charged and so subjected to the internal temperature of the battery during charging, second thermally responsive means subjected to the ambient temperature, and an electrical circuit controlled jointly by said first and second thermally responsive means and arranged to cause said circuit interrupter to be closed, completing said charging circuit until the internal temperature of the battery reaches a point which is relatively low when the ambient temperature is low and relatively higher when the ambient temperature is high.

5. In a battery charger, a charging circuit; a relay arranged to make and break said charging circuit; a Wheatstone bridge; means responsive to unbalance of said bridge in a definite sense only for causing said relay to complete said charging circuit, said means causing said relay to interrupt said charging circuit whenever said bridge is substantially balanced; a first thermally responsive impedance constructed for insertion in the battery to be charged, said first thermally responsive impedance being connected in said bridge to cause said bridge to be unbalanced in said definite sense whenever the temperature of said impedance is relatively low and to substantially balance said bridge when said impedance is at a relatively high temperature, and a second thermally responsive impedance subjected only to ambient temperature, said second thermally responsive impedance being so connected in said bridge as to cause said bridge to balance at a higher temperature of said first thermally responsive impedance when the ambient temperature is high and at a lower temperature of said first thermally responsive impedance when the ambient temperature is low.

6. In a battery charger, the combination of a charging circuit for supplying charging current to a battery; a relay arranged to make and break said charging circuit; a Wheatstone bridge including in one arm a first thermally variable impedance constructed to be inserted in the battery to be charged, whereby said bridge is unbalanced in a definite sense when the internal temperature of the battery is relatively low, such unbalance being recovered as the internal temperature of the battery rises during charging; means responsive to unbalance of said bridge for causing said relay to be closed to complete said charging circuit whenever said bridge is unbalanced in said definite sense and to remain closed until said bridge is substantially balanced, and a second thermally variable impedance connected in the arm of said bridge balancing said first mentioned arm, said second thermally variable impedance being arranged to respond only to ambient temperature, and said first and second thermally variable impedances having like temperature coefficients.

7. In a battery charger, a charging circuit; a relay arranged to make and break said charging circuit; a Wheatstone bridge; a first thermally variable impedance constructed for insertion in the battery to be charged, said first thermally variable impedance being connected in one arm of said bridge; a second thermally variable impedance subjected only to ambient temperature and connected in said arm of the bridge in series with said first thermally variable impedance, said first and second thermally variable impedances having opposite temperature coefficients, and means responsive only to unbalance of said bridge in a definite sense caused by a relatively low temperature of said first thermally variable impedance for causing said relay to be closed to complete said charging circuit and to remain closed until said bridge is substantially rebalanced.

8. In a battery charger, a charging circuit, a relay arranged to make and break said charging circuit, a Wheatstone bridge, a first thermally responsive impedance connected in one arm of said bridge and constructed for insertion in the battery to be charged, a fixed impedance connected in the arm of said bridge balancing said first mentioned arm, a second thermally responsive impedance connected in parallel with said fixed impedance and subjected only to ambient temperature, said first and second thermally responsive impedances having like temperature coefficients, and means responsive only to unbalance of said bridge in a definite sense caused by a relatively low temperature of said first thermally responsive impedance for causing said relay to complete said charging circuit and to remain closed until said bridge is substantially rebalanced.

9. In a battery charger, a charging circuit; a relay including an actuating winding and arranged to complete said charging circuit when said winding is energized and to interrupt said charging circuit when said winding is de-energized; a thermostatic switch unit including normally closed contacts; a first thermally responsive element in said switch unit constructed for insertion in the battery to be charged, said element normally causing said contacts to be opened upon occurrence of the internal temperature of the battery at which charging is to be terminated when ambient temperature is at a given normal value; a second thermally responsive element in said switch unit subjected to ambient temperature and arranged to adjust said switch unit to cause said contacts to be opened at a higher temperature of said first thermally responsive element when the ambient temperature increases and to cause said contacts to be opened at a lower temperature of said first thermally responsive element when the ambient temperature decreases, and a control circuit for said relay including said winding and the contacts of said thermostatic switch unit in series.

10. In a battery charger, a charging circuit; a relay including an actuating winding and arranged to complete said charging circuit when said winding is de-energized and interrupt said charging circuit when said winding is energized; a thermostatic switch unit including normally open contacts; a first thermally responsive element in said switch unit constructed for insertion in the battery to be charged, said element normally causing said contacts to be closed upon occurrence of the internal temperature of the battery at which charging is to be terminated when ambient temperature is at a given normal value; a second thermally responsive element in said switch unit subjected to ambient temperature and arranged to adjust said switch unit to cause said contacts to be closed at a higher temperature of said first thermally responsive element when the ambient temperature increases and to cause said contacts to be closed at a lower temperature of said first thermally responsive element when the ambient temperature decreases, and a control circuit for said relay including said winding and the contacts of said thermostatic switch unit in series.

JAMES B. GODSHALK.

REFERENCES CITED

The following references are of record in the file of this patent:

UNITED STATES PATENTS

| Number | Name | Date |
|---|---|---|
| Re. 22,883 | Heyer | May 27, 1947 |
| 1,457,863 | Strawmyer et al. | June 5, 1923 |
| 1,602,559 | Strawmyer | Oct. 12, 1926 |
| 1,758,522 | Kershaw | May 13, 1930 |
| 2,022,874 | West | Dec. 3, 1935 |
| 2,296,924 | Heyer et al. | Sept. 29, 1942 |
| 2,342,452 | Amsden | Apr. 25, 1944 |
| 2,354,877 | Peters | Aug. 1, 1944 |
| 2,355,488 | Van Vulpen et al. | Aug. 8, 1944 |
| 2,369,826 | Heyer et al. | Feb. 20, 1945 |
| 2,377,596 | Williams | June 5, 1945 |
| 2,402,695 | Taylor et al. | June 25, 1946 |
| 2,413,865 | Dalzell | Jan. 7, 1947 |
| 2,432,069 | Pugh | Dec. 2, 1947 |
| 2,436,057 | Pugh | Feb. 17, 1948 |
| 2,498,814 | Little et al. | Feb. 28, 1950 |
| 2,499,663 | Medlar | Mar. 7, 1950 |